Nov. 7, 1967    A. E. HIRSCH ET AL    3,351,314
SHOCK ISOLATION PLATFORM

Filed Feb. 2, 1966    2 Sheets-Sheet 1

INVENTOR.
ARTHUR E. HIRSCH
FRANK I. WHITTEN
EDWARD V. PICKFORD

ATTYS.

INVENTOR.
ARTHUR E. HIRSCH
FRANK I. WHITTEN
EDWARD V. PICKFORD

ATTYS.

United States Patent Office 3,351,314
Patented Nov. 7, 1967

3,351,314
SHOCK ISOLATION PLATFORM
Arthur E. Hirsch and Frank I. Whitten, Montgomery County, Md., and Edward V. Pickford, Washington, D.C., assignors to the United States of America as represented by the Secretary of the Navy
Filed Feb. 2, 1966, Ser. No. 524,981
11 Claims. (Cl. 248—358)

The invention described herein may be manufactured and used by or for the Government of the United States of America for governmental purposes without the payment of any royalties thereon or therefor.

This invention relates to shock isolation devices and more particularly to a shock isolation platform which is well adapted for use on the deck of a ship to protect personnel thereon from the injurious effects of violent deck accelerations and heavy shock loads that are encountered when a ship is torpedoed or strikes a mine.

The shock isolation platform contemplated by the present invention is basically comprised of a pair of spaced and opposed plates which are adapted to be carried within a well in the deck of a ship, the lower of the plates being seated on the bottom wall of the deck wall and the upper plate being positioned to fit flush with the deck. Personnel to be protected can thus stand on the upper plate of the platform with no difficulty or inconvenience just as if they were standing on the deck itself.

The two plates are operatively connected by two pairs of arms or links with each link of each pair being connected to the upper plate through the medium of a dashpot and with each pair of links being rotatably mounted on a common shaft which is held in a predetermined position on the bottom plate by a spring-loaded detent. The detent is loaded to release the shaft upon the application of a predetermined shock load to the bottom plate and, when released, permits the lower plate to move toward the upper plate, this movement rotating the links about the shafts and simultaneously imparting movement to the components of the dash-pots. A shock absorbing material or shock absorbing means is also carried between the plates and undergoes compression when the lower plate moves toward the upper plate.

When a ship incorporating the shock platform strikes a mine or is torpedoed, the shock loads produced by the violent deck accelerations, if exceeding a preselected magnitude sufficient to release the detents, will move the bottom plate toward the upper plate and the shock absorbing material will undergo compression. The shock absorbing material will thus absorb the heavy shock loads and the dash-pots will prevent the rapid rebound of the plates that would otherwise occur as a result of the stored energy in the compressed shock absorbing material. The platform will thus prevent injuries to personnel standing on the upper plate thereof by absorbing the heavy shock loads that are imparted to the deck. The platform will also prevent injuries to such personnel by eliminating the possibility of such personnel being violently ejected from the platform because of the rapid rebound thereof.

While intended to be used primarily as a personnel protective device, it will be appreciated that the platform of the present invention could also be used as a means to prevent damage to equipment of various kinds that is carried on the deck of a ship. Moreover, the platform could be used in an environment other than on a ship. In fact, it could be used in any environment wherein it is desired to protect either personnel or equipment from injury or damage resulting from heavy shock loads or rapid rebound.

Accordingly, one object of the present invention is to prevent injuries to shipboard personnel resulting from the application of heavy shock loads to the deck of the ship.

Another object of the invention is to prevent damage to equipment carried on the deck of a ship resulting from the application of heavy shock loads to the deck.

Another object of the invention is to provide a shock isolation platform which is adaptable for shipboard use.

Another object of the invention is to eliminate rapid rebound in a shock isolation device.

Another object of the invention is to provide a shock isolation device capable of absorbing extremely heavy shock loads in short intervals of time.

These and other objects of the present invention will become readily apparent from the following detailed description of one specific embodiment thereof when taken in connection with the accompanying drawings, wherein.

Figure 1:
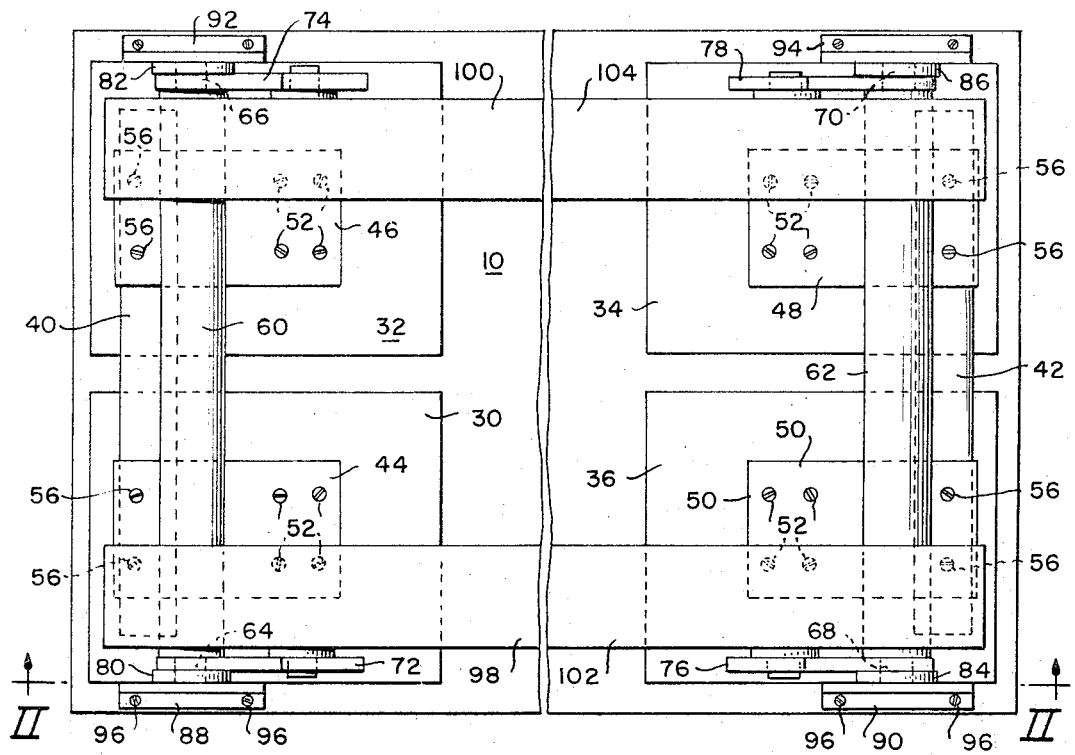
FIG. 1 is a top plan view of one specific embodiment of a shock isolation platform incorporating the invention with the upper plate of the platform being removed.
Figure 2:
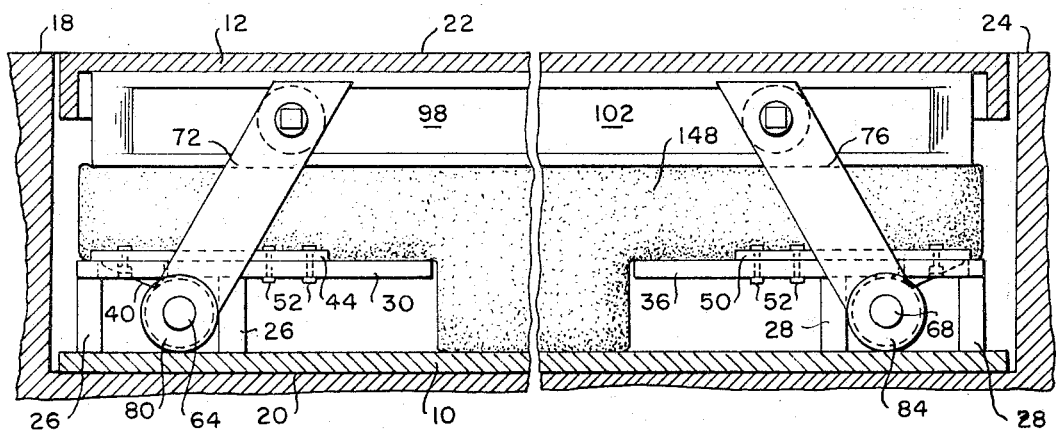
FIG. 2 is a section taken along the line II—II of FIG. 1.

Referring particularly to FIGS. 1 and 2 of the drawings, the shock isolated platform is shown as including a pair of spaced and opposed planar means, which in this one specific embodiment of the invention takes the form of a pair of spaced and opposed plates 10 and 12, the plates being designated hereinafter as bottom plate 10 and upper plate 12.

Plates 10 and 12 are substantially identical in size and, in this particular instance, are both substantially rectangular in configuration. Structurally, upper plate 12 differs from bottom plate 10 in one detail in that it is provided with a peripheral downturned flange 14 thereon.

As shown in FIG. 2, the shock isolation support is adapted to be seated or positioned within a well 16 in the deck 18 of a ship. Being so positioned, bottom plate 10 is seated on the bottom wall 20 of the well 16 and, with the components of a platform in the positions as shown in FIG. 2, upper plate 12 fits in the well with the outer surface 22 thereof being flush with the surface 24 of the deck. Bottom plate 10, if desired, may be rigidly secured by any suitable means (not shown) to the bottom wall 20 of the deck.

Upstanding support means are carried by bottom plate 10 and, in this particular instance, the support means assume the form of pairs of elongated bars or bar members 26—26 and 28—28. The pairs of bar members 26—26 and 28—28 extend substantially transversely of bottom plate 10 and are rigidly secured thereto by any suitable means (not shown). The bar members 26—26 and 28—28 are positioned on bottom plate 10 generally on the extreme left and right portions thereof, and the bar members of each pair are spaced a predetermined distance apart, this spacing between the bar members being carefully selected and serving a purpose to be discussed more fully hereinafter.

Plate means are carried by the support means or pairs of bar members, the plate means as best shown in FIG. 1 assuming the form of four substantially rectangularly-shaped plates 30, 32, 34 and 36. Plates 30 and 32 are carried by bar members 26—26 and plates 34 and 36 are, of course, carried by bar members 28—28. The four plates are rigidly secured to the pairs of bar members 26—26 and 28—28 by any suitable means (not shown) and when so secured to the bar members are positioned intermediate lower and upper plates 10 and 12, and extend substantially parallel thereto.

Figure 4:
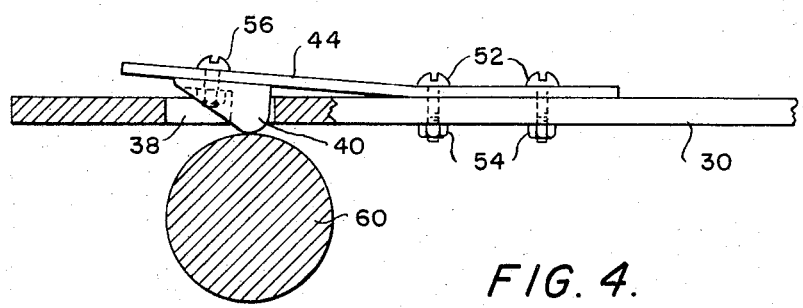
FIG. 4 is an enlarged detail view illustrating the construction and operation of the spring-loaded detent.
Figure 5:
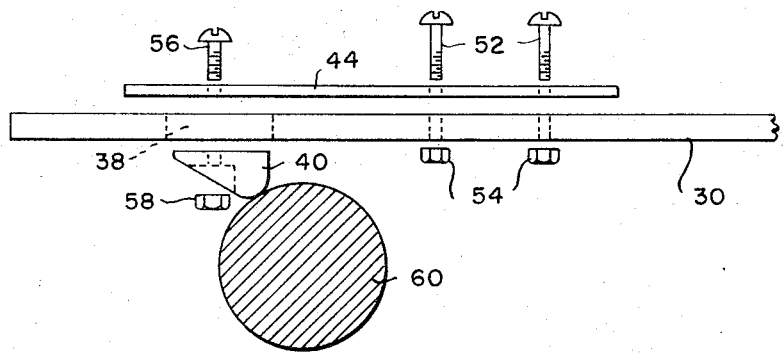
FIG. 5 is an exploded view of the components shown in FIG. 4.

As best seen in FIGS. 2, 4 and 5, each of the plates 30, 32, 34 and 36 is provided with a substantially laterally extending slot or passage 38 therein (reference numerals in FIGS. 4 and 5 only) which is adapted to receive a detent means or detent, this one specific embodiment of the invention incorporating two detents designated by the reference numerals 40 and 42. The slots 38 in plates 30 and 32 are aligned so as to receive detent 40 and the slots 38 in plates 34 and 36 are correspondingly aligned to receive detent 42. The detents 40 and 42 take the form of elongated members as best shown in FIG. 1 and, in cross section are generally triangular in shape with one edge thereof being rounded to provide a suitable surface for engaging a cylindrical shaft, as will be discussed more in detail hereinafter.

Detents 40 and 42 are each spring loaded and, as such, are rigidly connected to spring means, the spring means in this instance taking the form of pairs of leaf springs 44–46 and 48–50. The leaf springs are all substantially rectangular in configuration and are each rigidly secured to one of the plates 30, 32, 34 and 36, springs 44 and 46 being secured to plates 30 and 32, respectively, and springs 48 and 50 being secured to plates 34 and 36, respectively. All four springs are secured to the plates by means of a plurality of bolts 52, although it will be appreciated that any other suitable type of fastening means could be employed. The bolts 52 are received of course in aligned passageways (no reference numerals) in each spring and plate and nuts 54 are adapted to be threadedly received on the bolts. The two detents 40 and 42 in turn are connected to their respective springs by pairs of bolts 56, the bolts 56 also extending through aligned passageways in the springs and detents (no reference numerals) and carrying threaded nuts 58.

Shaft means are rotatably carried by bottom plate 10 and, in this one specific embodiment of the invention, the shaft means assumes the form of a pair of elongated shafts 60 and 62. Shafts 60 and 62 extend substantially transversely of bottom plate 10 and are positioned on bottom plate 10 between the pairs of bar members 26—26 and 28—28, respectively. The two shafts 60 and 62 normally occupy a position between the two pairs of bar members such that they abut one of the bar members and are firmly engaged by the detents 40 and 42, respectively, and, being so engaged, are thus held or retained in a predetermined position on bottom plate 10. Both shafts 60 and 62 are also provided with reduced diameter end portions, shaft 60 being provided with reduced end portions 64 and 66 and shaft 62 correspondingly being provided with reduced end portions 68 and 70.

Link means or arm means are rotatably carried on the reduced diameter end portions of shafts 60 and 62, the link means or arm means in this particular instance taking the form of single links or arms 72, 74, 76 and 78. Links 72 and 74 are rotatably carried on the reduced diameter portions 64 and 66 of shaft 60 and are thus both carried on a common shaft. Links 76 and 78 are correspondingly rotatably carried on the reduced diameter portions 68 and 70 of shaft 63 and are likewise carried on a common shaft. All four links have ports or holes therein (no reference numerals) which are adapted to receive the reduced diameter end portions of the two shafts. The holes in the links are of course slightly larger in diameter than the reduced diameter end portions of the shafts so that the links will rotate freely on the reduced diameter end portions.

Wheel means are also carried or positioned on the reduced diameter end portions of shafts 60 and 62, the wheel means in this instance taking the form of four wheels 80, 82, 84 and 86. Each wheel is provided with a hole or passage therein (no reference numeral) and the wheels are all adapted to snugly fit the reduced diameter end portions of the two shafts. Wheels 80 and 82 are carried on the reduced diameter end portions 64 and 66, respectively, of shaft 62 and wheels 84 and 86 are correspondingly carried on the reduced diameter end portions 68 and 70 of shaft 62. All four wheels are slightly larger in diameter than their respective shafts and thus any movement of the shafts 60 and 62 relative to bottom plate 10 would not be accompanied by any contact between the periphery of the shafts and bottom plate 10. The four wheels are employed in this particular instance because they produce far less frictional resistance when rolling on bottom plate 10 then would the two shafts 60 and 62. It will also be noted that the wheels are positioned on the reduced diameter end portions of the two shafts exteriorly of the four links.

The two shafts 60 and 62 as well as the four wheels carried thereby are retained in position on bottom plate 10 by means of a plurality of stops 88, 90, 92 and 94, the four stops being rigidly connected to bottom plate 10 and each being positioned in close proximity to the ends of the shafts and thus preventing excessive lateral movement of the shafts relative to the bottom plate. The four stops may be rigidly connected to the bottom plate by any suitable means, bolts and nuts being utilized in this one specified embodiment of the invention. Pairs of such bolts are illustrated in FIG. 1 and are designated by the reference numeral 96.

Dash-pot means are carried by upper plate 12 and, in this particular instance, four dash-pots 98, 100, 102 and 104 are carried on the under surface of the upper plate. The four dash-pots are rigidly secured to the under surface of plate 12 by any suitable means (not shown) and the dash-pots are positioned on upper plate 12 so that they can be connected to the links 72, 74, 76 and 78. The dash-pots may assume the form of several well known and commercially available types and the structural details per se of the dash-pots, thus, form no part of the present invention.

Figure 3:
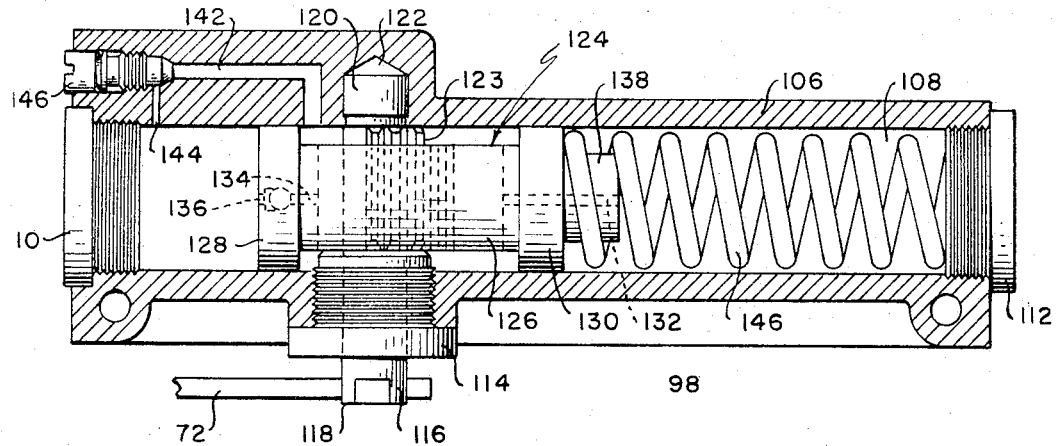
FIG. 3 is a transverse section through one of the dashpots of the shock isolation platform with some of the components of a dash-pot being shown in elevation.

The structural details of the dash-pots employed in the present instance are best illustrated in FIG. 3, all four of the dash-pots being identical in construction to that shown in FIG. 3. Dash-pot 98 is basically comprised of an elongated housing or casing 106 having a substantially longitudinally extending bore 108 therein. One end bore 108 is sealed by a threaded plug 110 while the opposite end is correspondingly sealed by a threaded plug 112. Housing 106 also carries another threaded plug 114, which plugs extend substantially transversely of the housing. Plug 114 carries a rotatable shaft 116 over end 118 of which is squared and the opposite end 120 of which is rotatably received within a bore 122 in the housing. The squared end 118 of shaft 16 is adapted to be drivingly connected to link 72, and, intermediate the ends thereof, shaft 116 is provided with a plurality of gear teeth 123 thereon, the shaft 116 with the gears 123 thereon in effect comprising a sector gear.

A piston member 124 is slidably carried within housing bore 108. Piston member 124 includes an elongated reduced diameter portion 126 in combination with two enlarged diameter portions 128 and 130 which are adapted to slidably engage the inner periphery of bore 108. The reduced diameter portion 126 of piston member 124 is provided with an enlarged substantially rectangularly-shaped passage therethrough (not shown) and two of the opposing walls of this passage are provided with teeth therein (not shown), which teeth are adapted to mesh with the teeth 123 on shaft 116. The piston member 124 with the teeth therein thus constitutes a rack which is adapted to be driven by the teeth 123 on shaft 116 as the shaft is rotated in either direction.

Piston member 124 is also provided with a small longitudinally extending passageway 132 therein which communicates with the rectangularly-shaped passage in the reduced diameter portion 126 of the piston member. Piston member 124 is also provided with another longitudinally extending passageway 134 therein, the passageway 134 communicating at one end with the rectangularly shaped passage in reduced diameter portion 126 and at the opposite end communicating with a one-way valve or check valve 136. The check valve 136 is constructed to permit the flow of fluid through passages 132 and 134 when the piston member 124 is moved to the right as shown in FIG. 3, but obstruct the flow of fluid through the two passageways when the piston is moved to the left.

Piston member 124 is provided with a reduced diameter extension 138 thereon which functions as a guide for a compression spring 140. This compression spring 140 biases piston member 124 to the left as shown in FIG. 3, with one end of the spring being seated on enlarged diameter portion 130 and the opposite thereof being seated on plug 112. Dash-pot 98 is also provided with another pair of communicating passageways 142 and 144 therein, which passageways are obstructed by a metering screw 146. By varying the position of metering screw 146, the rate of fluid flow through the two passageways 142 and 144 may be selectively varied, as is well known in the art.

As hereinbefore mentioned, the squared ends 118 of shafts 116 of the four dash-pots are adapted to be connected to the four links or arms, links 72 being connected to the squared shaft on dash-pot 98, link 74 being connected to the squared shaft on dash-pot 100, link 76 being connected to the squared shaft on dash-pot 102, and link 78 being connected to the squared shaft on dash-pot 104. All four of the links are provided with square-shaped passages or holes therein and the squared shafts of the dash-pots are adapted to be snugly received within the square-shaped passages in the links.

Resilient means, or, in this particular instances, a resilient shock absorbing material 148 is positioned or carried in the space between the upper and lower plates 12 and 10. The resilient shock absorbing material in this one specific embodiment of the invention assumes the form of polyurethane foam rubber, although it will be apparent that any other suitable type of resilient shock asborbing material could be employed. Moreover it will also be apparent that a resilient means in a form of a plurality of springs could also be used as a shock absorbing means between the two plates.

In operation, the platform is carried in the well 16 in the deck 18 of a ship and the components of the platform normally assume the positions as shown in FIG. 2. In these normal positions, detents 40 and 42 hold the shafts 60 and 62 in predetermined positions on bottom plate 10 and upper plate 12 fits flush with the upper surface 24 of deck 18.

When the ship strikes a mine or is torpedoed, the deck will be violently accelerated over a period of a few milliseconds. These violent accelerations will result in the application of heavy shock loads to the deck 18 and the deck 18, as viewed in FIG. 2, will move upwardly. If these shock loads exceed a predetermined magnitude, for example, six g's, the detents 40 and 42 will be unseated by the shafts 60 and 62, and the wheels carried thereon will move longitudinally of bottom plate 10. Such longitudinal movement of the two shafts 60 and 62 will of course produce rotation of the four links 72, 74, 76 and 78 which in turn will result in the rotation of the shafts 116 of the four dash-pots. Rotation of the four dash-pot shafts 116 will in turn produce movements of the piston members 124 within the dash-pots. As lower plate 10 moves upwardly, the resilient shock absorbing material 148 will also undergo a compression with the result that energy will be stored therein.

When bottom plate 10 reaches the upper limits of its travel as a result of the shock loads applied thereto, the compressed shock absorbing material 148 will immediately tend to urge the two plates to their normal or original positions which in turn will produce a counter-rotation of the four arms or links. The dash-pots however, will oppose any rapid return of the components of the platform to their original positions inasmuch as the oil or fluid in the dash-pots will be slowly metered past metering screws 146 therein. This retarding action of the dash-pots thus permits the components to slowly reassume their normal or original positions and, in particular, prevents the upper plate 12 from being violently accelerated upwardly due to the stored energy in the resilient shock absorbing means 148. Deck personnel standing on upper plate 12 will thus be protected against injuries resulting from the application of heavy shock loads to deck 18 and, at the same time, will be protected against injuries which would otherwise result from the rapid rebound of upper plate 12.

In this one specific embodiment of the invention, all of the components of the platform are made of non-magnetic materials, namely stainless steel and aluminum. A platform made of non-magnetic materials has been found to be especially advantageous for use in naval vessels such as minesweepers. It will become apparent, however, that the platform could also be made of materials other than those which are nonmagnetic.

Obviously many modifications and variations of the present invention are possible in the light of the above teachings. It is therefore to be understood that within the scope of the appended claims the invention may be practiced otherwise than as specifically described.

What is claimed is:
1. A shock isolation platform comprising:
   first planar means;
   second planar means opposed to said first planar means and spaced therefrom;
   shaft means rotatably carried on said first planar means;
   detent means carried by said first planar means and acting on said shaft means to hold said shaft means in a predetermined position on said first planar means;
   dash-pot means carried by said second planar means;
   arm means connecting said shaft means and said dash-pot means and being rotatably carried on said shaft means; and
   resilient means carried between said planar means;
   said first planar means when exposed to shock loads exceeding a predetermined magnitude being operable to move said shaft means beyond said detent means and move towards said second planar means;
   said resilient means undergoing compression upon movement of said first planar means toward said second planar means and absorbing the shock loads applied to said first planar means;
   said dash-pot means being operable to prevent the rapid rebounding of said planar means due to the stored energy in said resilient means after the compression thereof.

2. A shock isolation platform as claimed in claim 1 further including plate means carried by said first planar means and spring means connected to said plate means;
   said detent means being connected to said spring means.

3. A shock isolation platform as claimed in claim 2 further including support means carried by said first planar means;
   said plate means being connected to said support means and said support means functioning as stops to limit the range of movement of said shaft means on said planar means.

4. A shock isolation platform as claimed in claim 3 wherein said support means takes the form of two pairs of bar members carried by said first planar means;
   each bar member of each pair being spaced a predetermined distance apart to limit the range of movement of said shaft means;
   each bar member being rigidly connected to said first planar means and extending substantially transversely of said first planar means.

5. A shock isolation platform as claimed in claim 4 wherein said plate means assumes the form of four, substantially rectangularly-shaped plates;

said plates being rigidly connected to said bar members and being positioned intermediate said first and second planar means.

6. A shock isolation platform as claimed in claim 1 wherein said first and second planar means assume the form of a pair of flat plates;

the plates as components of the platform being adapted to fit within a well on the deck of a ship;

the first planar means being adapted to seat on the bottom wall of said well and the second planar means being adapted to fit flush with said deck;

the plate of said second planar means having a peripheral downturned flange thereon.

7. A shock isolation platform as claimed in claim 1 wherein said shaft means assumes the form of two shafts;

said shafts spaced a predetermined distance apart and extending substantially transversely of said first planar means;

the opposite ends of each shaft being reduced in diameter and being rotatably connected to said arm means.

8. A shock isolation platform as claimed in claim 7 further including wheel means carried on the reduced diameter ends of each shaft;

said wheel means being larger in diameter than said shafts and thereby rotatably supporting said shafts for movement on said first planar means.

9. A shock isolation platform as claimed in claim 8 wherein said arm means takes the form of two pairs of arms connecting said two shafts to said dash-pot means;

one pair of arms being rotatably carried on the reduced diameter ends of one of said shafts and the other pair of arms being rotatably carried on the reduced diameter ends of the other of said shafts;

said wheel means bearing against said arms and retaining said arms on said reduced diameter end of said shafts.

10. A shock isolation platform as claimed in claim 9 wherein said dash-pot means carried by said second planar means assumes the form of four dash-pots;

one end of each of said arms being operatively connected to one of said dash-pots.

11. A shock isolation platform as claimed in claim 1 wherein said resilient means assumes the form of a mass of polyurethane foam rubber.

References Cited

UNITED STATES PATENTS

| | | | |
|---|---|---|---|
| 3,061,260 | 10/1962 | Simons et al. | 248—399 |
| 3,075,736 | 1/1963 | Freedman | 248—400 |
| 3,207,112 | 9/1965 | Fox | 114—65 |

ROY D. FRAZIER, *Primary Examiner.*

R. P. SEITTER, *Assistant Examiner.*